Patented Oct. 27, 1925.

1,558,627

UNITED STATES PATENT OFFICE.

ALFRED POLLAK, OF VIENNA, AUSTRIA.

PRODUCTION OF NUTRIENT MEDIA FOR GROWING YEAST.

No Drawing.   Application filed March 16, 1923. Serial No. 625,616.

*To all whom it may concern:*

Be it known that I, ALFRED POLLAK, a citizen of the Republic of Czechoslovakia, residing at Vienna, Austria, have invented a new and useful Improvements in Production of Nutrient Media for Growing Yeast, of which the following is a specification.

My invention relates to a process of producing a richly nitrogenous food extract for use in the production of yeast.

It is well-known that the yeast cell is capable of utilizing nitrogen, necessary for building up its protoplasm, out of all possible forms and combinations available to it. Moreover it is equally well-known that the character of the nitrogen food determines the quality of the cultivated yeast, and particularly of those physiological characteristics which are of primary importance in the practical use of yeast.

In manufacturing yeast it is easy to obtain it in large quantities but of poorer quality, i. e., of decreased fermentability and of decreased stability; but it is difficult to derive yeast of well preserved physiological characteristics, i. e., a yeast which most nearly resembles the seed yeast employed. or, preferably excels in certain characteristics thereof, e. g., in stability, resistance, etc. In this case only the nutritious and stimulating matters that are supplied can have a controlling effect, and primarily the nitrogen nutrition supplied.

Recent physiological research has revealed the fact that the cell must have quite distinct substances available to it if it is to develop its existing and growing structure, or is to build up new substance. Unless supplied to it, the cell must prepare for itself these constituents, and must therefore decompose highly organized proteinic matters, when offered in the raw materials, or it must split off nitrogen out of inorganic compounds and synthetically produce the necessary organic constituents.

It is obvious, and this is also known from general nutrition physiology, that this work to be performed by the cell may be avoided by artificially combining the nutrition to be supplied, in such a manner, that the cell can derive therefrom the necessary component parts without further work.

It is the object of the present invention to provide a novel process for producing a food extract which is particularly suitable for the propagation of yeast, especially when used up in the modern air yeast process where high yields and strong baking qualities of the yeast are required.

It is generally known that a yeast food extract may be produced from waste yeast by autolysis. Furthermore, it is well-known that when malting cereals or leguminoses, a strong enzymatic decomposition of the nitrogenous substances results and that these decomposition products supply the material for building up the yeast protoplasm.

Those skilled in the art are familiar with the important fact that the different decomposition products of the proteins in general act in a different way on the growing yeast: some of them, as the lowest decomposition products, influence favorably the quantity of newly formed yeast, whereas the more highly complex compounds have effect more on the quality thereof.

Now in the method which I am describing here of producing a food extract by decomposing proteinic matters under strictly new conditions, there is the great advantage that the available proteins of the raw materials used in yeastmaking, are far better utilized. Furthermore, the decomposition is carried out in such a way that both the quantity and the quality of the produced yeast will be highly improved by the relative quantities of the decomposition products formed.

The process of decomposing nitrogenous material is indicated or even often practiced in the fermentation industries by the enzymatic decomposition thereof; but it can be materially shortened and cheapened if the decomposition is effected by means of acid.

A large number of similar processes are already known. They have all the same defect that the final product, i. e., the final decomposition product of protein by acids, lacks those constitutents which are required for the production of good yeast in large quantities.

In some of these processes strong mineral acids are used and the hydrolysis is completed until the lowest decomposition products of protein are obtained. From the standpoint of yeast-production this is neither desirable nor economical; because, for the manufacture of a high grade yeast with strong baking qualities and good keeping qualities there is necessary the presence of decomposition products which are more highly organized than the amino-acids or ammonia-salts, such as peptones and, apparently, even higher stages, such as albumoses.

Some other known processes have the opposite effect, in that in the so-called peptonizing process a small part of the nitrogenous bodies is partially dissolved by a very diluted acid, but the disintegration is not carried to the stages in which they can be assimilated by the yeast.

The present method eliminates these drawbacks. In its essentials it is as follows: The available insoluble proteins are first brought into solution in the well known manner by the dissolving action of a sufficiently strong acid, such as sulphuric acid or muriatic acid. The strong acid will act quickly enough, just to break down the insoluble protein and make it soluble, without forming in this short time too great a quantity of the lowest decomposition products. With certain proteins this solution may be obtained at low temperature, but with most of them the solution is obtained at high temperature or under pressure, whereby less acid may be used. When this first dissolution of the protein is obtained then the operation of the strong acid is interrupted and a weak decomposition action is continued in various ways, until the particular decomposition stage is reached, at which the final product has the most favorable composition for feeding the growing yeast. A certain percentage of the nitrogen is then present in the form of amino-acid and similar products, while the balance will be in the form of bodies of the peptone stage or albumose stage. In this kind of hydrolysis all the stages of decomposition occur simultaneously; but by varying the strength of the acid and of the temperature and of the duration of the operation, the percentage ratio of the resulting higher and lower decomposition products may be varied at will.

As mentioned above; after all the protein is brought into solution, the strong action of the acid is interrupted. This may be accomplished in the following manner:

The strong acid reaction of the mass may be diminished by cooling, or by dilution with a neutral liquid, and the further decomposition of the dissolved protein may be continued until the desired stage is reached. Or, without further dilution, the strong acid may be completely neutralized, or neutralized to any desired degree, depending upon the kind of raw material used and upon the manner in which the ensuing weak decomposition action is to be continued, by the addition thereto of alkalies or their various salts with certain acids, and the decomposition may then be continued in a weaker acid medium. Usually it will be found suitable to reduce the original strong acid to 10–30% of its strength.

Preferably, ammonia or its basic salts are used for the neutralization. Lime may be used, particularly, when it is desired to eliminate most of the sulphuric acid from the reaction mass.

In this case, or if it is desired to continue the decomposition to the desired stage with a weaker acid, such as, preferably, phosphoric or lactic acid, the strong sulphuric acid is neutralized by the addition of the calcium phosphate or calcium lactate. In both cases gypsum will be precipitated and phosphoric acid, or lactic acid, will be liberated and the decomposition can be completed by one of these acids or their acid salts.

If muriatic acid is used in the primary dissolving of the protein, then urea is preferably used for the partial neutralization.

This process makes possible single or multiple combinations of all kinds of rich protein containing raw materials, the component parts of which have characteristics of value to the yeast cell. Depending on the degree of resistance that the proteins offer to their decomposition, they will be separately subject to hydrolysis or will be mixed in such a manner that the various stages of decomposition will occur in the proper ratio in the final product.

It will be obvious that, if the raw materials contain valuable soluble bodies which might be damaged during the acid treatment or by high temperature, such as soluble albumen itself, enzymes, vitamines, organic-phosphoric compounds, etc., these bodies may be extracted in the well-known manner by dissolving first in water and filtering, prior to the acid treatment. The insoluble residue is then treated by strong acids as hereinbefore described, and the soluble bodies just mentioned are later added to the finished product.

Similarly, it will be obvious that the product of the acid hydrolysis may be freed in the well-known manner of all insoluble substances and also freed of color, if desired: then if it appears necessary, it is more highly concentrated or entirely dried, either by adding thereto other thickening or neutralizing materials, or by entirely drying in accordance with well-known processes.

A further modification of the present process consists in first bringing the raw material containing the protein into solution by strong acid action; then the acid is bound by precipitation or by neutralization in the above described manner and in the solution thus obtained the further decomposition is completed by the addition of peptic enzymes of any origin, or by bacterial fermentation, e. g., by lactic acid bacteria, or the like. In the latter case, the carbohydrates necessary for initiating the fermentation of the lactic acid bacteria are added to the solution.

Example.

As raw materials, I may use leguminous flour, soja-flour, oil cakes, cereal seeds, bran, grains, dry yeast, or any vegetable proteinic matter; or casein, fibroin, kollagen, meat meal, etc. These materials may be used singly or in any desired combination, so as to insure the presence in the final product of all the constituent parts, necessary for the propagation and growth of yeast of best qualities. A part of the raw material is mixed with sufficient water to make a thick mash, and then enough sulphuric acid is added so that the total mass will contain 5-15% by weight thereof. The mass is now heated for an appreciable length of time to a high temperature, between 100-110° C. and will begin rapidly to thin. Depending on the raw materials used, the solution of the protein bodies will take place in from three to twelve hours. When this happens the strong acid action is then interrupted, for instance, by adding calcium-phosphate corresponding to the amount of used sulphuric acid. The mass which now contains phosphoric-acid is maintained at about 100° C. until a test shows that all the higher albumen complexes are spilt to such an extent that, in addition to amino-acids, only peptones and albumoses are found in the solution. Depending on the raw material employed 12-24 hours are necessary for this. The mass is then brought to weakly acid reaction by means of ammonia, and is freed of insoluble residue by centrifugal, suction or pressing operations. The solution so obtained may be further treated for the purpose of concentration or color removal, or it may be added directly to the yeast mash.

The manner in which the various modifications of the present process may be practised will clearly appear from the above.

The qualitative test which will indicate that in the decomposition of the proteins the stage of the peptones and albumoses is reached, and all stages higher than this have disappeared is as follows: 100 c. c. of the solution are diluted with double the amount of water, then filtered clear. The filtrate is put in test tubes, 20 c. c. in each. Increasing amounts of ammonium-sulphate salt are added, starting with $3^g$, the next $4^g$, $5^g$, etc. The higher the amount of proteins which were not yet split up, the earlier a precipitate will start in the test tube. This routine test has to be controlled from the beginning by a quantitative test, such as precipitation by copper-sulfate and phosphorus-tungstenic acid, and testing the nitrogen in the precipitate.

If is it desired further to decompose, by means of enzyme or bacterial fermentation, the proteins dissolved by strong acid, then, after the acid treatment, the reaction mass is neutralized, and after the necessary dilution it is treated with extract rich in enzymes or is subjected to a lactic acid fermentation by adding first sacchariferous materials. This operation may be further simplified by directly introducing into the yeast manufacturing process the neutralized or slightly acid reaction mass, by adding it directly to the mash which is to be saccharified by means of the malt. This mash is then subjected to a lactic souring process.

What I claim is:

1. The process of producing a richly nitrogenous food for yeast production, which comprises treating water insoluble protein matter with an aqueous solution of sufficiently high hydrogen ion concentration to dissolve the protein and to convert some of the protein present into peptone and albumose and some into less complex nitrogen compounds, and then substantially reducing the hydrogen ion concentration and continuing the conversion to increase the relative amount of said less complex nitrogen compounds.

2. The process of producing a richly nitrogenous food for yeast production, which comprises treating water insoluble protein matter with an aqueous solution of sufficiently high hydrogen ion concentration to dissolve the protein and to convert some of the protein present into peptone and albumose, and some into bodies of at least the amino acid stage, and then substantially reducing the hydrogen ion concentration and continuing the conversion to increase the relative amount of bodies of stages at least as low as the amino acid stage.

3. The process of producing a richly nitrogenous food for yeast production, which comprises treating water insoluble protein matter with an aqueous solution of sufficiently high hydrogen ion concentration to dissolve the protein and to convert some of the protein present into peptone and albumose and some into less complex nitrogen compounds, then reducing the acidity to about one tenth ($\frac{1}{10}$) to three tenths ($\frac{3}{10}$) of its strength and continuing the conversion to increase the relative amount of said less complex nitrogen compounds.

4. The process of producing a richly nitrogenous food for yeast production, which comprises treating water insoluble protein matter with an aqueous solution of sufficiently high hydrogen ion concentration to dissolve the protein and to convert some of the protein present into peptone and albumose, and some into bodies of at least the amino acid stage, and then reducing the acidity to about one tenth ($\frac{1}{10}$) to three tenths ($\frac{3}{10}$) of its strength and continuing the conversion to increase the relative amount of bodies of stages at least as low as the amino acid stage.

5. The process which comprises the treatment according to claim 1 applied to material containing the water-insoluble proteins and water-soluble yeast nutrient material which would be injured as a yeast nutrient by said treatment, and which also comprises water extracting such soluble matter before such treatment and adding such extracted matter to the remainder after such treatment.

6. The process which comprises the treatment according to claim 2 applied to material containing the water-insoluble proteins and water-soluble yeast nutrient material which would be injured as a yeast nutrient by said treatment, and which also comprises water extracting such soluble matter before such treatment and adding such extracted matter to the remainder after such treatment.

In testimony whereof I have affixed my signature.

ALFRED POLLAK.